United States Patent
Ignatowicz et al.

(10) Patent No.: US 11,914,556 B2
(45) Date of Patent: Feb. 27, 2024

(54) LAZY VIRTUAL FILESYSTEM INSTANTIATION AND CACHING

(71) Applicant: Red Hat, Inc., Raleigh, NC (US)

(72) Inventors: Eder Ignatowicz, Cambridge, MA (US); Alexandre Porcelli Bakos, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 1194 days.

(21) Appl. No.: 16/165,475

(22) Filed: Oct. 19, 2018

(65) Prior Publication Data

US 2020/0125650 A1 Apr. 23, 2020

(51) Int. Cl.
*G06F 16/00* (2019.01)
*G06F 16/188* (2019.01)
*G06F 16/14* (2019.01)
*G06F 16/172* (2019.01)

(52) U.S. Cl.
CPC .......... *G06F 16/188* (2019.01); *G06F 16/148* (2019.01); *G06F 16/172* (2019.01)

(58) Field of Classification Search
CPC .......... G06F 15/167; G06F 2003/0697; G06F 3/0601; G06F 16/188; G06F 16/148; G06F 16/172; H04L 29/08846; H04L 67/2823; H04L 67/2842
See application file for complete search history.

(56) References Cited

U.S. PATENT DOCUMENTS

| | | | | |
|---|---|---|---|---|
| 7,139,811 B2 * | 11/2006 | Lev Ran | ................. | G06F 9/546 |
| | | | | 709/217 |
| 7,711,788 B2 * | 5/2010 | Lev Ran | ................. | H04L 67/02 |
| | | | | 709/213 |
| 8,041,893 B1 * | 10/2011 | Fung | ..................... | G06F 12/124 |
| | | | | 711/118 |
| 8,055,702 B2 * | 11/2011 | Lango | ................... | G06F 15/167 |
| | | | | 709/203 |
| 8,204,871 B1 | 6/2012 | Pawar et al. | | |
| 8,788,628 B1 * | 7/2014 | Taylor | .................. | G06F 16/182 |
| | | | | 709/219 |
| 9,152,600 B2 * | 10/2015 | Lango | ................... | G06F 15/167 |
| 9,330,109 B2 * | 5/2016 | Bone | ..................... | G06F 16/185 |
| 9,547,726 B2 * | 1/2017 | Ran | ..................... | H04L 67/1095 |

(Continued)

OTHER PUBLICATIONS

Developing a Custom File System Provider; https://docs.oracle.com/javase/8/docs/technotes/guides/io/fsp/filesystemprovider.html; 1993, 2018; retrieved Oct. 1, 2018 (2 pages).

(Continued)

*Primary Examiner* — Dinku W Gebresenbet (57) ABSTRACT

A host with a memory, which stores a guest, a filesystem cache, and a proxy cache, has a filesystem manager executing on a processor that receives a first request to locate a file in a first filesystem. In response to receiving the first request, a filesystem proxy in the proxy cache associated with the first filesystem is queried. The first request is responded to based on metadata retrieved from the filesystem proxy. A second request is received to modify the file. In response to receiving the second request, the first filesystem is instantiated in the filesystem cache, where a second filesystem is evicted from the filesystem cache to reclaim storage capacity for the first filesystem. The file in the first filesystem is modified.

20 Claims, 5 Drawing Sheets

(56) References Cited

U.S. PATENT DOCUMENTS

| | | | | |
|---|---|---|---|---|
| 9,678,968 B1* | 6/2017 | Taylor | | G06F 3/0608 |
| 10,061,852 B1* | 8/2018 | Plenderleith | | H04L 67/568 |
| 10,402,373 B1* | 9/2019 | VanderKnyff | | G06F 9/45533 |
| 2002/0165911 A1* | 11/2002 | Gabber | | G06F 16/10 |
| | | | | 707/E17.12 |
| 2004/0255048 A1* | 12/2004 | Lev Ran | | G06F 16/9574 |
| | | | | 709/249 |
| 2007/0174428 A1* | 7/2007 | Lev Ran | | H04L 67/06 |
| | | | | 709/218 |
| 2011/0246986 A1* | 10/2011 | Nicholas | | G06F 11/0778 |
| | | | | 718/1 |
| 2012/0011324 A1* | 1/2012 | Fung | | G06F 11/3466 |
| | | | | 711/136 |
| 2012/0089700 A1* | 4/2012 | Safruti | | H04L 67/2842 |
| | | | | 709/217 |
| 2013/0110778 A1* | 5/2013 | Taylor | | G06F 11/1435 |
| | | | | 707/624 |
| 2013/0111262 A1* | 5/2013 | Taylor | | G06F 11/2005 |
| | | | | 714/4.11 |
| 2014/0006357 A1* | 1/2014 | Davis | | G06F 3/067 |
| | | | | 707/667 |
| 2016/0253193 A1* | 9/2016 | Tsirkin | | G06F 9/45558 |
| | | | | 718/1 |
| 2018/0191672 A1* | 7/2018 | Torres | | H04L 61/4511 |
| 2019/0095336 A1* | 3/2019 | Barczak | | G06F 3/0685 |

OTHER PUBLICATIONS

Amazon-S3-FileSystem-NIO2; GitHub; https://github.com/Upplication/Amazon-S3-FileSystem-NIO2; retrieved Oct. 1, 2018; pp. 1-4.

Merge Remove java.nio.file package; by Przemyslaw Szczepaniak; https://android.googlesource.com/platform/libcore/+/af40563ea3a8bc05242a0685b653166bd450f43b%5E1..af40563ea3a8bc05242a0685b653166bd450f43b/; Jan. 27, 2016, Retrieved Oct. 1, 2018 (449 pages).

Java Code Examples for java.nio.file.File System; https://www.programcreek.com/java-api-examples/index.php?api=java.nio.file.FileSystem; retrieved Oct. 1, 2018; pp. 1-14.

Chapter 9 The File system; by David A. Rusling; http://en.tldp.org/LDP/tlk/fs/filesystem.html; 1996-1999; retrieved Oct. 1, 2018; pp. 1-16.

\* cited by examiner

LAZY VIRTUAL FILESYSTEM INSTANTIATION AND CACHING

BACKGROUND

The present disclosure generally relates to shared computing environments. Specifically, shared computing environments, whether public or privately implemented within an organization, typically employ orchestration of the deployment of isolated guests that perform the computing tasks in the networked computer systems. These guests typically host applications that perform computing tasks, including user interfacing computing tasks. In computer systems, it may be advantageous to scale application deployments by using isolated guests such as virtual machines and containers that may be used for creating hosting environments for running application programs. Isolated guests enable a programmer to quickly scale the deployment of applications to the volume of traffic requesting the applications, and may be deployed in a variety of hardware environments. Multiple guests may also be clustered together to perform a more complex function than the respective containers are capable of performing individually. Many applications require persistent storage to store data used in the execution of the applications and/or current execution states of those applications. Therefore persistent storage may be provisioned and allocated to the guests executing in a computing environment. Computer systems, both physical and virtual, typically employ filesystems to control access to files stored in the memory device(s) of the computer system.

SUMMARY

The present disclosure provides a new and innovative system, methods and apparatus for lazy virtual filesystem instantiation and caching. In an example, a host with a memory, which stores a guest, a filesystem cache, and a proxy cache, has a filesystem manager executing on a processor that receives a first request to locate a file in a first filesystem. In response to receiving the first request, a filesystem proxy in the proxy cache associated with the first filesystem is queried. The first request is responded to based on metadata retrieved from the filesystem proxy. A second request is received to modify the file. In response to receiving the second request, the first filesystem is instantiated in the filesystem cache, where a second filesystem is evicted from the filesystem cache to reclaim storage capacity for the first filesystem. The file in the first filesystem is modified.

Additional features and advantages of the disclosed method and apparatus are described in, and will be apparent from, the following Detailed Description and the Figures.

DETAILED DESCRIPTION OF EXAMPLE EMBODIMENTS

In computer systems, virtualization may be implemented to allow for flexible scaling of computing resources, for example, in a multi-tenant cloud environment. In an example, a virtual machine ("VM") may be a robust simulation of an actual physical computer system utilizing a hypervisor to allocate physical resources to the virtual machine. In some examples, a container based virtualization system, for example, one managed by a container manager such as Red Hat® OpenShift® executing a containerization runtime environment such as Docker® may be advantageous, as container based virtualization systems may be lighter weight than systems using virtual machines with hypervisors. Another advantage of virtual guests is that a virtual guest may allow a host to execute code that is incompatible with the host's operating system and/or hardware by creating a virtual, emulated, controlled environment in which the incompatible code may execute. In some implementations (e.g., Java®), a virtualized hosting engine (e.g., Java Runtime Environment®) may execute on an underlying system (e.g., physical host, VM, container, etc.) and allow the execution of applications configured to execute on that hosting engine (e.g., Java applications). In these implementations, any operating system capable of executing a version of the virtualized hosting engine may therefore execute these applications, allowing for the same source code to be ported between and to execute on a variety of underlying environments (e.g., operating systems, hardware) that may be incompatible with each other.

Many network applications, such as those hosted on containers in multi-tenant clouds, may require access to data stored on a host (e.g., physical host, VM, container) or the saving of an execution state for a particular user accessing the application. For example, an online game may require the saving of game progress; an e-commerce site may require the saving of payment information and shopping carts; and a social media site may require the saving of interactions with a given post. Many applications may save data in the background for future interactions, for example, customizable interface settings and display preferences. Where settings and/or data require long term storage so that the data is available in future sessions of the application, storage that persists past the termination of a container executing the application may be required. Such applications may typically be referred to as stateful, in contrast to stateless applications where each interaction with the application is effectively independent of a subsequent interaction (e.g., web search, voice over internet protocol, video conferencing). In a typical example, such persistent storage may store data in devices such as hard drive disks ("HDD"), solid state drives ("SSD"), and/or persistent memory (e.g., Non-Volatile Dual In-line Memory Module ("NVDIMM")). Storage devices, such as HDDs, SSDs, and NVDIMMs, may have storage capacity organized and accessed via filesystems. In a typical example, a host, whether physical or virtual, may be configured to access its associated storage devices through a host filesystem. For example, a storage device may be mounted and then formatted with a filesystem compatible with an operating system of the host before the storage capacity of the storage device is accessible and/or addressable by the host (e.g., by the host's operating system). In an example, a guest may access its host's filesystem through one or more virtualized filesystems (e.g., to manage different user rights) that allow users of the guest to locate, retrieve, and/or modify these files. On network applications, hundreds, even thousands of users may interact with a given web application (e.g., the online retailer) and these individual user sessions may be assigned their own access credentials and their own filesystems, in part to enhance security and prevent unauthorized access to the files on the host of the web application. In the example, each of these user's filesystems may require space in memory to be stored (e.g., stored in heap space in the virtual hosting engine). This may result in significantly increasing the memory footprint of the virtual hosting engine. In addition, these virtual filesystems may be configured to remain in memory for extended amounts of time in case a given user reconnects, which may effectively result in a steady leakage of memory capacity as the web application remains online. In an example, while the web application is executing, it maintains its execution state by storing that execution state in memory, and part of the web application's execution state is the filesystems and other user specific configurations associated with the users that have connected to the web application.

The present disclosure aims to address the memory footprint issues related to systems that utilize numerous virtual filesystems, regardless of how many layers of virtualization may be underlying those virtual filesystems through lazy virtual filesystem instantiation and caching. In an example, a limited set of actively in use virtual filesystems are stored in a specialized filesystem cache, which may be preferentially implemented in a high speed memory (e.g., DRAM, persistent memory) for enhanced performance. The filesystem cache effectively limits the amount of memory that may be taken up by the virtual filesystems on a host because the filesystem cache may be configured with a limited capacity. In the example, a filesystem manager is configured to intercept filesystem requests, and to respond to these requests with filesystem proxies that include metadata associated with the virtual filesystems on the host. In the example, any request that may be answered with only metadata queries (e.g., whether a file exists, a file's modification time, access permissions to a file, etc.) and without accessing the contents of any files may be responded to with a query to a filesystem proxy. Since these metadata filesystem proxies are typically orders of magnitude smaller than filesystem objects, a significant amount of space in memory may be conserved. In addition, querying the smaller filesystem proxies may return results faster. In the example, only when a given filesystem request requires the contents of a file in the filesystem (and in such cases only after access permissions are validated), is the filesystem itself instantiated. In a typical implementation, well less than half of all filesystem requests actually request for the contents of a file, and typically these content requests may be associated with relatively few user sessions. Therefore, a filesystem cache that caches 10% or even 1% of the total filesystems requested on a host may be sufficient to cover the vast majority of filesystem content requests. All other filesystems on the host may remain uninstantiated, but ready to be instantiated due to the metadata required to generated the filesystems being maintained as filesystem proxies. Therefore, by practicing lazy virtual filesystem instantiation and caching, host memory usage may be decreased, effectively allowing increased compute density and therefore higher hardware utilization.

Figure 1:
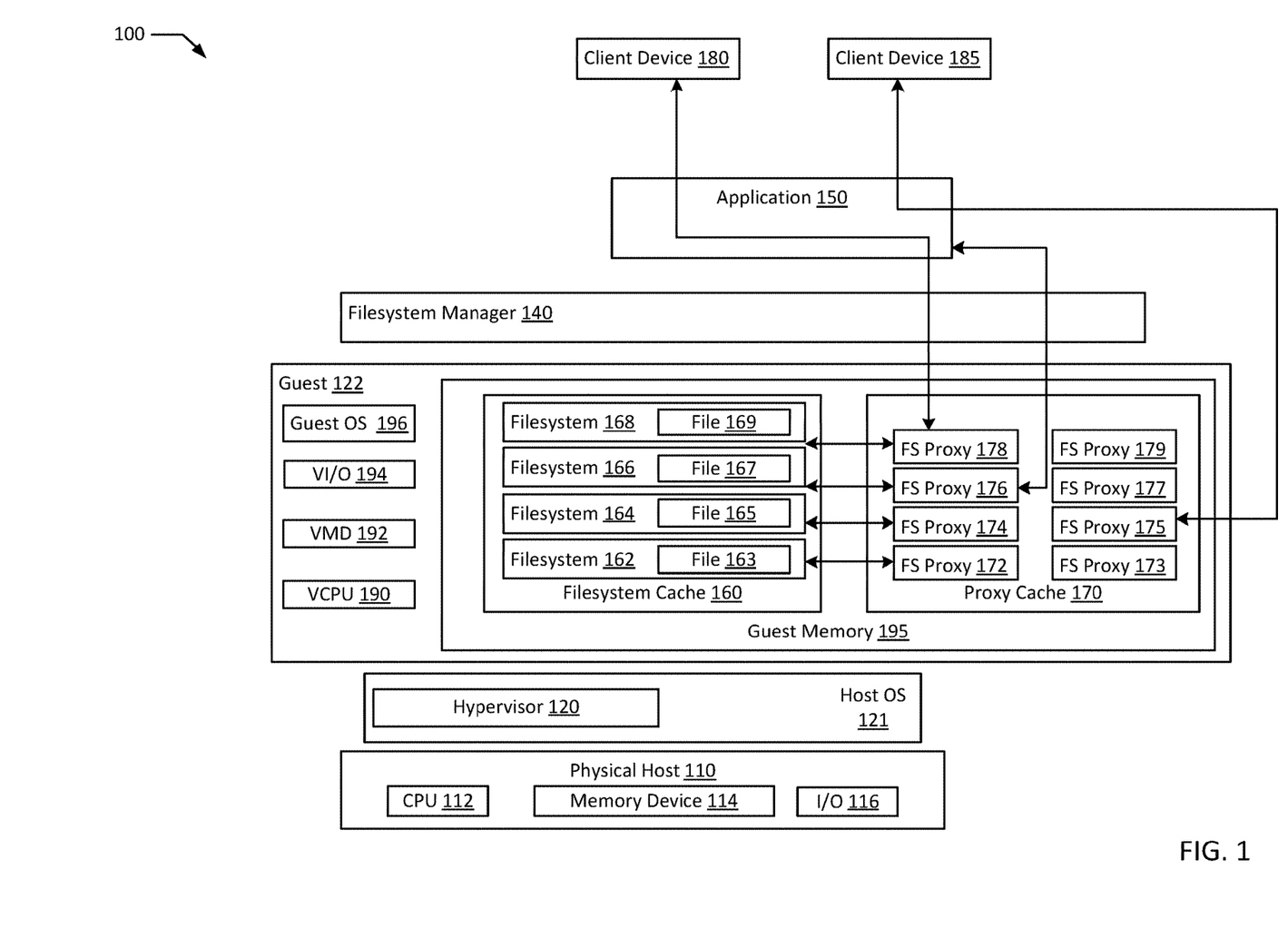
FIG. 1 is a block diagram of a system configured with lazy virtual filesystems according to an example of the present disclosure.

FIG. 1 is a block diagram of a system configured with lazy virtual filesystems according to an example of the present disclosure. The system 100 may include one or more physical host(s) 110. Physical host 110 may in turn include one or more physical processor(s) (e.g., CPU 112) communicatively coupled to memory device(s) (e.g., MD 114) and input/output device(s) (e.g., I/O 116). As used herein, physical processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. For example, a network interface card may be an example of an I/O device through which physical host 110 and guests (e.g., guest 122) hosted on physical host 110 communicates with external systems over a network. CPU(s) 112 may be interconnected using a variety of techniques, ranging from a point-to-point processor interconnect, to a system area network, such as an Ethernet-based network. Local connections within physical host 110, including the connections between processor 112 and a memory device 114 and between processor 112 and I/O device 116 may be provided by one or more local buses of suitable architecture, for example, peripheral component interconnect (PCI).

In an example, physical host 110 may host one or more guests (e.g., guest 122). In an example guests may be VMs and/or containers, which may additionally host additional nested layers of guests (e.g., where application 150 hosted on guest 122 is another guest). For example, application 150 may be another virtual guest (e.g., Java Virtual Machine® or "JVM") nested inside of a virtual machine or container guest 122. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may execute on physical host 110 (e.g., on host OS 121 of physical host 110). In an example, guest 122 may execute on a virtual host (e.g., a VM) executing on physical host 110. In addition, containers and/or VMs may further host other guests necessary to execute their configured roles (e.g., a nested hypervisor or nested containers). In an example, a guest (e.g., guest 122) further host additional guests such as a Java® Virtual Machine ("JVM"), for example, if execution of Java® code is necessary.

System 100 may run a software layer (e.g., hypervisor 120) above the hardware and below the guests (e.g., guest 122), as schematically shown in FIG. 1. In an example, the hypervisor 120 may be a component of host operating system 121, which executes on physical host 110. In another example, the hypervisor 120 may be provided by an application running on host operating system 121. In an example, hypervisor 120 may run directly on physical host 110 without an operating system beneath hypervisor 120. Hypervisor 120 may virtualize the physical layer, including processors, memory, and I/O devices, and present this virtualization to guests (e.g., guest 122) as devices, including virtual central processing unit ("VCPU") 190, virtual memory devices ("VMD") 192, virtual input/output ("VI/O") device 194, and/or guest memory 195. Processor virtualization may be implemented by the hypervisor 120 scheduling time slots on physical processors 112 such that from the guest operating system's perspective those time slots are scheduled on a virtual processor 190.

Guest 122 may run on any type of dependent, independent, compatible, and/or incompatible applications on the underlying hardware and host operating system 121. In an example, application 150 running on guest 122 may be dependent on the underlying hardware and/or host operating system 121. In another example, application 150 running on guest 122 may be independent of the underlying hardware and/or host operating system 121. In an example, application 150 running on guest 122 may be compatible with the underlying hardware and/or host operating system 121. Additionally, application 150 running on guest 122 may be incompatible with the underlying hardware and/or OS. The hypervisor 120 may manage memory for the host operating system 121 as well as memory allocated to guest 122 and guest operating system 196 such as guest memory 195 provided to guest OS 196. In an example, guest 122 may execute on host OS 121, and may be dependent on host OS 121 for memory and/or processor management. In an example, code executing on guest 122 may be required to be compatible with guest OS 196 but not with host OS 121. In an example, any form of suitable network for enabling communications between computing devices, for example, a public network (e.g., the Internet), a private network (e.g., a local area network (LAN) or wide area network (WAN)), or a combination thereof may be employed to connect physical host 110 and/or guest 122 to other computer systems.

In an example, application 150 may execute on guest 122 serving client devices including client devices 180 and 185. In the example, client devices 180 and 185 may be any type of network accessible device with their own respective processors, memories, and/or I/O devices capable of accessing application 150 for processing tasks. In an example, application 150 is configured to allocate or assign filesystems (e.g., filesystems 162, 164, 166, 168, associated with filesystem proxies 172, 174, 176, and 178 respectively, as well as filesystems associated with filesystem proxies 173, 175, 177, and 179) to users accessing application 150. In some examples, each user account accessing application 150 is assigned a separate filesystem (which may be represented by a filesystem proxy). In an example, filesystems 162, 164, 166, and/or 168 are filesystems controlling how data is stored and retrieved. Filesystems 162, 164, 166, and/or 168 may be configured or organized as hardware interfacing filesystems (e.g., FAT, NTFS, HFS, UDF, ext, JFS etc.) that organize storage access to hardware devices (e.g., memory device 114, VMD 192, etc.). In some examples, filesystems 162, 164, 166, and/or 168 may be database filesystems with extended metadata and search functionality (e.g., IBM® DB2®). Filesystems 162, 164, 166, and/or 168 may or may not support hierarchical directory structures. In an example, filesystems 162, 164, 166, and/or 168 are virtual filesystems that may or may not be configured in a format that is compatible with usage as a hardware controlling filesystem. For example, filesystems 162, 164, 166, and/or 168 may be implemented through a filesystem virtualization engine (e.g., Java® NIO.2) that may interpret any form of file organization structure as a filesystem. In an example, filesystems 162, 164, 166, and/or 168 may be implemented with a database and/or version control system structure, for example, in the form of git repositories. In an example, guest 122 stores actively instantiated filesystems (e.g., filesystems 162, 164, 166, and 168) in a filesystem cache 160 which may be a partition of guest memory 195 or virtual memory device 192. In an example, filesystem cache 160 may be configured to utilize high performance, fast storage (e.g., DRAM, persistent memory). In an example, filesystem cache 160 may be restricted to a total aggregate size and/or a total count of filesystems, with unused filesystems evicted to make room for newly instantiated filesystems. In an example, filesystems 162, 164, 166, and 168 allow access to files 163, 165, 167, and 169 respectively. In the example, files 163, 165, 167, and 169 may be the same file within a filesystem of guest OS 196. In another example, files 163, 165, 167, and 169 may be different files. In an example, access rights (e.g., read-only, read-write, execution privileges, etc.) to files 163, 165, 167, and/or 169 may be different when accessed via filesystems 162, 164, 166, and 168 even if the underlying physically stored file is the same file. For example, where files 163 and 165 are the same file, when accessed through filesystem 162 the file 163 may be read only, while when accessed through filesystem 165, file 164 may be read-write.

In an example, proxy cache 170 may be implemented as a similar memory partition to filesystem cache 160. In the example, proxy cache 170 stores filesystem proxies 172-179, with filesystem proxies 172, 174, 176, and 178 corresponding respectively with filesystems 162, 164, 166, and 168. In an example, each filesystem proxy in proxy cache 170 may be associated with a different user of application 150. For example, client device 180 may be associated with filesystem proxy 178, client device 185 with filesystem proxy 175, and application 150 itself with filesystem proxy 176. In an example, each of filesystem proxies 172-179 includes all of the metadata necessary to define and instantiate a respective filesystem (e.g., filesystems 162, 164, 166, and 168). In the example, any time a request related to a file is received by application 150, the request is intercepted and processed by filesystem manager 140. In an example, filesystem manager 140 may interpret the request into a request to query a filesystem proxy associated with a filesystem accessible to the user issuing the file request. In the example, the respective filesystem proxy includes the metadata of the files and directories of its associated filesystem and querying the filesystem proxy returns results equivalent to querying the actual filesystem for file information requests. In an example, querying a filesystem proxy may be faster than querying a filesystem, for example, due to the filesystem proxy's smaller size and/or more efficient indexing. In an example, a filesystem proxy (e.g., filesystem proxies 172-179) may be stored in any suitable non-transitory computer accessible format.

In an example, client devices 180 and 185 may access application 150 over a network, which may be any form of suitable network for allowing communications between computing devices, for example, a public network (e.g., the Internet), a private network (e.g., a local area network (LAN) or wide area network (WAN)), or a combination thereof. In an example, filesystems 162, 164, 166, 168, filesystem proxies 172-179, filesystem cache 160, and/or proxy cache 170 may be implemented in or as a suitable type of database, for example, a relational database, which may be associated with a database management system (DBMS). A DBMS is a software application that facilitates interaction between the database and other components of the physical host 110 or guest 122. For example, a DMBS may have an associated data definition language describing commands that may be executed to interact with the database. Examples of suitable DMBS's include MariaDB®, PostgreSQL®, SQLite®, Microsoft SQL Server® available from MICROSOFT® CORPORATION, various DBMS's available from ORACLE® CORPORATION, various DBMS's available from SAP® AG, IBM® DB2®, available from the INTERNATIONAL BUSINESS MACHINES CORPORATION, etc. In an example, filesystems 162, 164, 166, 168, filesystem proxies 172-179, filesystem cache 160, and/or proxy cache 170 may be configured as a formal database with a schema such as a relational schema with defined tables, indices, links, triggers, various commands etc. In some examples, filesystems 162, 164, 166, 168, filesystem proxies 172-179, filesystem cache 160, and/or proxy cache 170 may not be configured as a formal database, but may instead be an alternative storage structure capable of holding the information and being queried in relation to filesystem requests in system 100, including but not limited to a file, folder, directory, registry, etc.

Figure 2A:
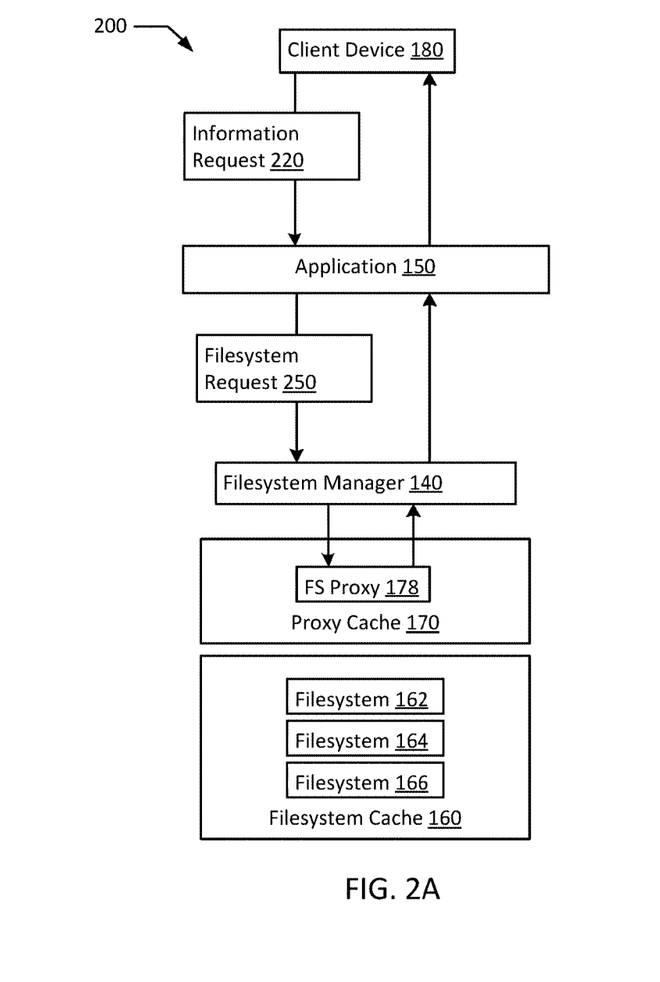
FIGS. 2A-B are block diagrams of a system responding to file information and file content requests with filesystem proxies and lazily instantiated filesystems according to an example of the present disclosure.
Figure 2B:
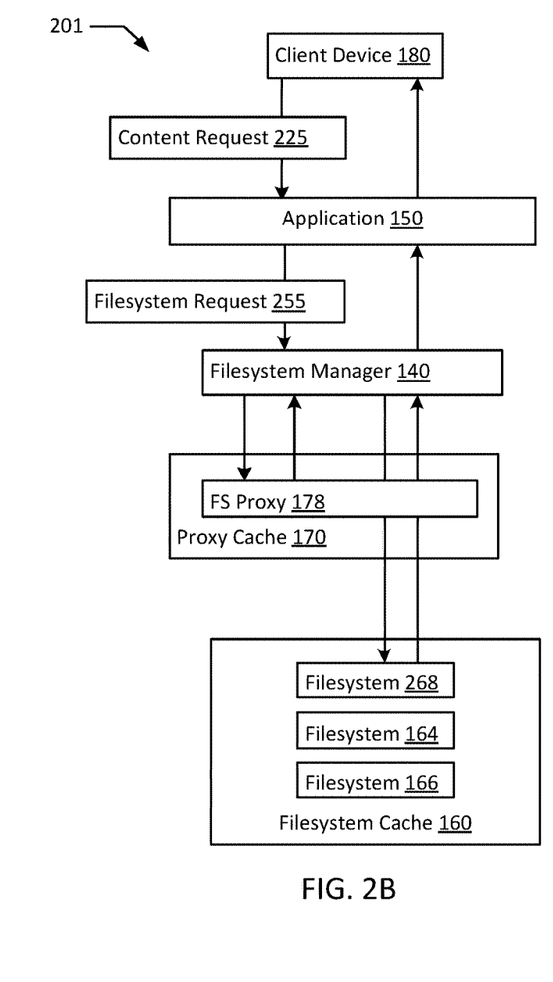

FIGS. 2A-B are block diagrams of a system responding to file information and file content requests with filesystem proxies and lazily instantiated filesystems according to an example of the present disclosure. Illustrated system 200 in FIG. 2A depicts the handling of information request 220 from client device 180 by application 150 and filesystem manager 140. In an example, client device 180 accesses application 150, and sends a request (e.g., information request 220) to determine if a certain configuration file is stored on guest 122 hosting application 150. In the example, upon establishing a connection with application 150, which may be an application running in a virtual environment (e.g., a Java Runtime Environment®), the user of client device 180 may be assigned to the user's own filesystem within the virtual environment hosting application 150's processing modules. In the example, application 150 sends a filesystem instantiation request associated with the user of client device 180 to guest 122 hosting application 150, and this filesystem instantiation request is intercepted by filesystem manager 140. In the example, instead of instantiating a filesystem in filesystem cache 160 associated with client device 190, a filesystem proxy 178 associated with client device 180 is instantiated in proxy cache 170, where filesystem proxy 178 includes all of the metadata descriptors that would be associated with a filesystem assigned to the user account of client device 190. In an example, filesystem manager 140 may respond that a filesystem has been instantiated for the user account of client device 190 upon instantiation of filesystem proxy 178, even though filesystem 168 was never actually instantiated.

In an example, with filesystem proxy 178 instantiated, when client device 180 sends information request 220 to determine whether the configuration file exists, application 150 converts information request 220 into a filesystem request 250 sent to filesystem manager 140, for example, to query a filesystem associated with client device 180 to determine whether the configuration file exists. In an example, when filesystem manager 140 receives filesystem request 250, no filesystem is actually instantiated in filesystem cache 160 that corresponds to client device 180's user account. However, filesystem proxy 178 is stored and accessible in proxy cache 170, and filesystem manager 140 queries filesystem proxy 178 to determine whether the configuration file exists and/or is accessible to the user of client device 180. In some examples, even if a filesystem corresponding to client device 180 (e.g., filesystem 168) is stored in filesystem 160, filesystem manager 140 nevertheless queries filesystem proxy 178 for the existence of the configuration file. For example, queries to filesystem proxy 178 may respond faster than queries to filesystem 168 due to the smaller size of filesystem proxy 178, and/or better indexing for searches than filesystem 168. In the various examples, filesystem request 250 to filesystem manager 140 results in a query to filesystem proxy 178, whose response (e.g., that the configuration file exists) is forwarded by filesystem manager 140 to application 150 and then on to client device 180. In a typical scenario, client device 180 may only be concerned that a valid configuration file exists, and may not need to validate or access the contents of the configuration file. In such scenarios, client device 180's interaction with its assigned filesystem may therefore be limited to a metadata request that is answerable by querying associated filesystem proxy 178. Many typical filesystem requests may be requests to retrieve information relating to the filesystem (e.g., a filesystem name or universal resource locator address) instead of retrieving the contents of any file in the filesystem.

Illustrated system 201 in FIG. 2B is an example of a future state of system 200 at a later point in time. For example, client device 180 issues a new request (e.g., content request 225) to read and/or modify the contents of the configuration file from system 200. In an example, application 150 takes the content request 225 and generates filesystem request 255 intercepted by filesystem manager 140. In an example, filesystem manager 140 interprets content request 225 and determines that a filesystem (e.g., filesystem 268, a new copy of filesystem 168) needs to be instantiated in filesystem cache 160 to respond to a request for accessing or modifying the contents of a file in filesystem 268 (e.g., the configuration file). In an example, to instantiate filesystem 268, filesystem proxy 178 is accessed to retrieve the metadata in filesystem proxy 178 describing the structure of filesystem 268. In some examples, sending a request to filesystem proxy 178 to access the contents of a file may trigger a respond from filesystem proxy 178 to start the instantiation of filesystem 268. In an example, filesystem cache 160 may have insufficient capacity to instantiate filesystem 268, and therefore a filesystem (e.g., filesystem 162) in filesystem cache 160 is selected for eviction. In the example, filesystem 162 is deleted to make room for filesystem 268 in filesystem cache 160. In an example, at least some of the memory addresses used to store deleted filesystem 162 are overwritten to store filesystem 268. In the example, because filesystem 162's associated filesystem proxy 172 remains in proxy cache 170, filesystem 162 may be reinstantiated at will without any loss of data. For example, the underlying files accessible through filesystem 162 will remain in guest memory 195, while the descriptors for the structure of filesystem 162 are maintained in filesystem proxy 172. In an example, a filesystem of application 150 (e.g., filesystem 166) may be protected from eviction. In an example, because filesystem 166 is frequently accessed by application 150, filesystem 166 is never unused long enough to face eviction.

In an example, in response to receiving the metadata from filesystem proxy 178 describing filesystem 268, filesystem manager 140 instantiates filesystem 268 in filesystem cache 160. In the example, filesystem 268, after instantiation, is accessible to filesystem manager 140. In the example, filesystem request 255 is fulfilled by providing access to the configuration file in filesystem 268 to application 150 and client device 180. In some examples, rather than accessing filesystem 268 directly, instructions to filesystem 268 may be issued to filesystem proxy 178, which may in turn forward the instructions to filesystem 268 (e.g., via filesystem manager 140). In these examples, by initially issuing instructions and/or queries to filesystem proxy 178, any requests that may be handled by filesystem proxy 178 without accessing filesystem 268 are handled first by filesystem proxy 178, and therefore potentially handled more efficiently than a request to filesystem 268. For example, metadata operations related to files in filesystem 268 may be handled faster by preferentially handling requests using filesystem proxy 178 rather than filesystem 268. For example, moving a file from one directory to another may be achieved with a metadata path modification in filesystem proxy 178 that is lazily synchronized to filesystem 268. In an example, each filesystem (e.g., filesystem 268) and filesystem proxy (e.g., filesystem proxy 178) pairing may be identified with a shared filesystem identifier (e.g., filesystem name). In an example, filesystem manager 140 may be configured with a list of actions that require accessing an actual filesystem object (e.g., filesystem 268), for example, retrieving file contents, executing a file, and/or modifying file contents. In such an example, if one of these types of requests is received by filesystem manager 140 as a content request, the filesystem manager 140 may directly interact with a respective filesystem object (e.g., filesystem 268). In the example, any requests not configured in this list may be treated as an information request, and filesystem manager 140 may interact with associated filesystem proxy 178 for a potentially faster response via metadata queries rather than accessing filesystem 268. In an example, different implementations may have different metadata fields populated in their filesystem proxies, and a request that may be handled by a filesystem proxy in one case may require access to a filesystem object in another. In an example, if, after querying a filesystem proxy (e.g., filesystem proxy 178), the filesystem manager is incapable of handling the request from filesystem manager 140, the request is rerouted to filesystem 268 (either through filesystem manager 140 or by being directly forwarded by filesystem proxy 178). In an example, if filesystem 268 is not yet instantiated, a filesystem instantiation sequence is triggered by the forwarded request from filesystem proxy 178. In an example, filesystem manager 140 initially attempts to respond to all filesystem requests by querying filesystem proxies, and only attempts to interact with filesystem objects upon a failure to handle a request by querying the filesystem proxies. In an example, interacting with filesystem proxies may allow a filesystem manager 140 to handle the majority of filesystem requests, and therefore a predetermination of whether to utilize a filesystem proxy or a filesystem object to respond to the request may be a net inefficient determination to make. In an example, upon generation of filesystem 268 from filesystem proxy 178, the generated filesystem 268 object may be stored as a memoized result of the generation sequence for generating filesystem 268 from filesystem proxy 178. Thereafter, instead of regenerating filesystem 268 from filesystem proxy 178, a request for filesystem 268 may retrieve the cached result (e.g., the memoized version) of filesystem 268 from filesystem cache 160. In an example, the memoized version of filesystem 268 is accessible to threads executing on any virtual processor of guest 122.

In an example, filesystem manager 140 detects that filesystem cache 160 is experiencing unacceptable levels of cache churn, that is, evictions are occurring too frequently. For example, if filesystem cache 160 is configured to store one hundred filesystems, but one hundred and ten are being frequently accessed, actively used filesystems may be regularly evicted. In such a scenario, filesystem cache 160 may be configured to be expanded based on the churn rate as measured based on instantiations of filesystems or evictions of filesystems over a given time frame. In an example, a filesystem evicted from filesystem cache 160 may first be swapped into a temporary retention buffer (e.g., in slower memory such as HDD) before being deleted in case the filesystem is re-requested. In an example where filesystem cache 160 is configured with a maximum storage size in addition to or in place of a maximum filesystem count, multiple filesystems in the filesystem cache 160 may require eviction to instantiate a larger filesystem. In such examples, filesystems may be removed or evicted in reverse order of last access time in order to create space for instantiating the new filesystem.

Figure 3:
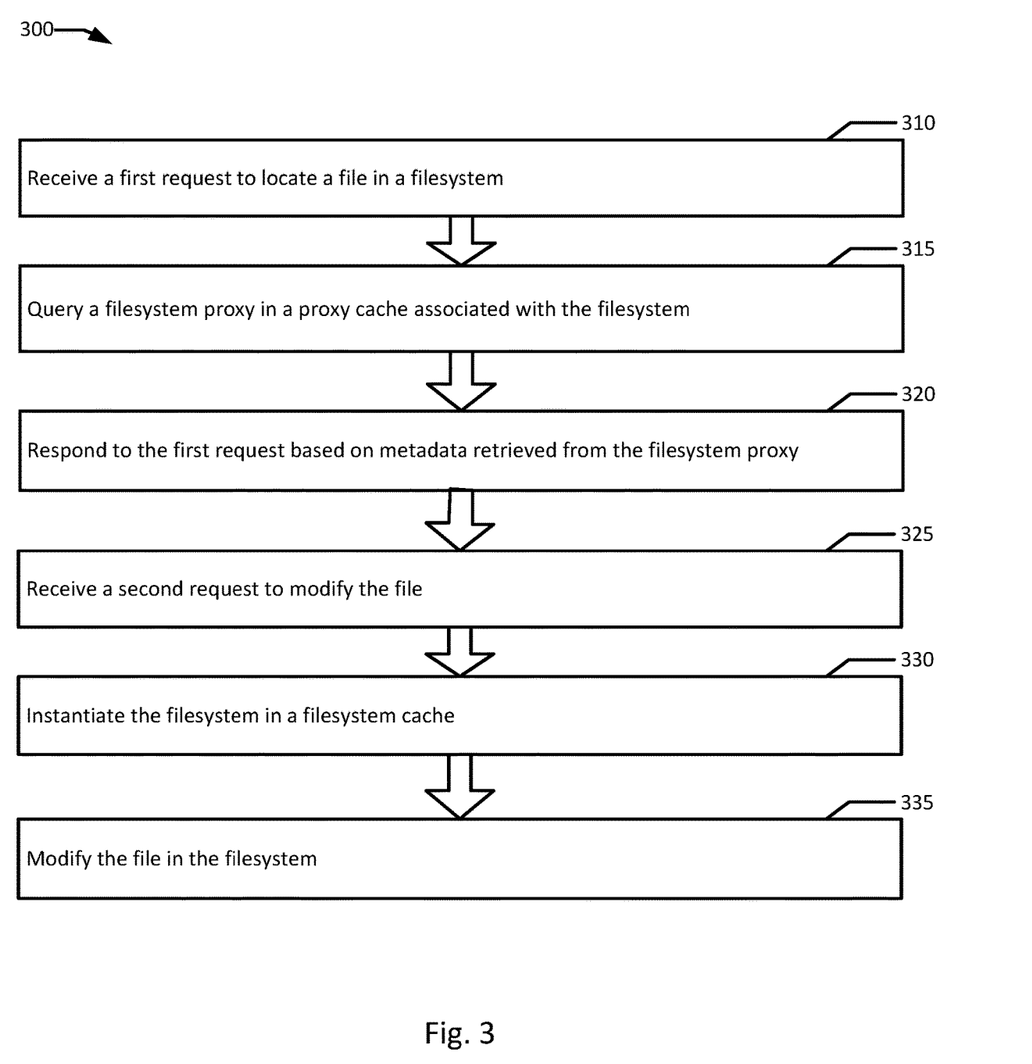
FIG. 3 is flowchart illustrating an example of lazy virtual filesystem instantiation and caching according to an example of the present disclosure.

FIG. 3 is flowchart illustrating an example of lazy virtual filesystem instantiation and caching according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method 300 is performed by a filesystem manager 140.

Example method 300 may begin with receiving a first request to locate a file in a filesystem (block 310). In an example, filesystem manager 140 receives a request (e.g., filesystem request 250 from application 150) for the path of a file in filesystem 168. For example, application 150 may send a filesystem information request to guest OS 196 that is intercepted by filesystem manager 140. In the example, filesystem 168 is a filesystem associated with a first user of application 150 (e.g., a user of client device 180). In the example, filesystem 168 may or may not have been previously instantiated in filesystem cache 160, but filesystem 168 is not currently instantiated in filesystem cache 160. In an example, the first time that filesystem 168 is requested after the instantiation of guest 122, the filesystem manager 140 intercepts the request for filesystem 168 as a filesystem instantiation request associated with filesystem 168 and filesystem manager 140 generates filesystem proxy 178 in proxy cache 170 instead of instantiating filesystem 168 in filesystem cache 160. In an example, subsequent requests for filesystem 168 may be processed through filesystem proxy 178 instead of directly through filesystem 168. In the example, filesystem proxy 178 includes all of the metadata entries necessary to fully define the structure of filesystem 168. In an example, filesystem 168 is a virtual filesystem exposing limited access to guest memory 195, virtual memory device 192, and/or memory device 114 to the user of client device 180. In an example, filesystem 168 is a virtual filesystem that is configured as a database schema, where files accessible through filesystem 168 are configured as database entries in the database schema. For example, filesystem 168 may be configured as a git repository. In an example, each user accessing application 150 and/or guest memory 195 may be assigned a separate virtual filesystem. In an example, instantiating filesystem proxy 178 does not require that filesystem 168 have ever been instantiated on guest 122.

A filesystem proxy in a proxy cache associated with the filesystem is queried (block 315). For example, in response to receiving the first request to locate file 169 from client device 180, filesystem manager 140 queries filesystem proxy 178 for a path of the file. In an example, filesystem proxy 178 associated with filesystem 168, which at this point in time may not have been actually instantiated, includes metadata information on the structure and contents of filesystem 168, including the path of the file. In the example, querying filesystem proxy 178 provides filesystem manager 140, and therefore application 150 with the path of the file. In various examples, any metadata descriptor of filesystem 168 or any file in filesystem 168 may be included in filesystem proxy 178. For example, an information request regarding filesystem 168 and/or a file in filesystem 168 may retrieve metadata from filesystem proxy 178 that includes a file path, creation timestamp, modification timestamp, size, existence, access permissions, and/or an inode.

The filesystem manager responds to the first request based on metadata retrieved from the filesystem proxy (block 320). In an example, filesystem proxy 178 includes metadata that is interpreted by filesystem manager 140 as a response to the request to locate the file 169. In an example, filesystem manager 140 presents to guest 122 and/or application 150 that filesystem 168 exists and is instantiated in filesystem cache 160 on the basis of filesystem proxy 178 being stored in proxy cache 170, even while filesystem 168 is uninstantiated in or evicted from filesystem cache 168. In an example, filesystem manager 140 simulates responses to queries to filesystem 168 by querying filesystem proxy 178. In an example, information requests (e.g., requests pertaining to metadata attributes filesystem 168 and/or files (e.g., file 169) in filesystem 168) may be responded to with information stored in filesystem proxy 178, while filesystem 168 only needs to be instantiated in filesystem cache 160 in order to access the contents of file 169 in filesystem 168 for reading, executing, or modifying.

A second request to modify the file is received (block 325). In an example, after filesystem manager 140 responds to application 150 with the path of the file, filesystem manager 140 receives a request to retrieve file 169 for modification. For example, the user of client device 180 requests to modify file 169 through application 150, and application 150 sends a filesystem content request to guest OS 196 that is intercepted by filesystem manager 140. In the example, filesystem manager 140 may determine that filesystem proxy 178 associated with filesystem 168 is stored in proxy cache 170. In an example, filesystem proxy 178 includes all of the necessary descriptive metadata information necessary to generate a filesystem object for filesystem 168, and this metadata information is retrieved by filesystem manager 140 in preparation for generating filesystem 168.

The filesystem (e.g., filesystem 268) is instantiated in a filesystem cache (block 330). In an example, another filesystem 162 is evicted from the filesystem cache 160 to reclaim storage capacity for filesystem 168. For example, in response to receiving the second request to modify file 169 from client device 180, the filesystem manager 140 determines that access to filesystem 168 is required as querying filesystem proxy 178 would not grant access to the contents of the file. In the example, metadata information on the structure of filesystem 168 retrieved from filesystem proxy 178 is used by filesystem manager 140 to generate a filesystem object of filesystem 168 to be stored in filesystem cache 160. In an example, computations to instantiate filesystem 168 from filesystem 178 may be relatively expensive, and therefore once the computation is performed once, it is preferable to avoid performing the computations again. In the example, once generated, the results of the generation of the filesystem object of filesystem 168 are cached in memoized form (e.g., the results of the computations to generate filesystem 168 are stored in a lookup table). For example, when a request to generate filesystem 168 is received again, instead of computing to generate filesystem 168 from metadata (e.g., from filesystem proxy 178), the memoized stored copy of filesystem 168 is retrieved from filesystem cache 160. In such an example, a request to generate filesystem 168 or 268 may be the same as a request to access filesystem 168 or 268. For example, filesystem manager 140 may be configured to retrieve a filesystem object of filesystem 268, which may be interpreted as a request to generate filesystem 268 (e.g., from filesystem proxy 178). In the example, if filesystem 268 is already stored in filesystem cache 160 in memoized form, instead of computing to generate filesystem 268, the stored copy of filesystem 168 is retrieved instead. Therefore a request to generate filesystem 268 would yield the same result as a request to retrieve filesystem 268 from filesystem cache 160. In an example, filesystem cache 160 is limited in size based on a count of the filesystems cached in filesystem cache 160 (e.g., filesystems 162, 164, 166, and 168), and/or a maximum aggregated stored size of these filesystems. In an example, prior to instantiating filesystem 168, filesystem cache 160 may already be at capacity. In the example (e.g., as illustrated in system 201 in FIG. 2B), one or more filesystems (e.g., filesystem 162) is evicted from filesystem cache 160, before a copy of filesystem 168 is stored as filesystem 268 in filesystem cache 160. In an example, filesystem cache 160 is configured to grow based on an observed cache miss rate in processing requests for retrieving filesystems by filesystem manager 140. For example, if a certain threshold number of new filesystem instantiations are requested in a configured time window based on filesystem content requests, filesystem cache 160 may be configured to grow in size and/or filesystem count. In an example, a filesystem instantiation request results from attempting to retrieve a filesystem from filesystem cache 160 (e.g., based on an inability to handle a request with metadata stored in a corresponding filesystem proxy) and discovering that the filesystem being requested is not currently cached. In an example, if a filesystem (e.g., filesystem 166 associated with application 150's core processes) is requested that is currently resident in filesystem cache 160, the cached copy may be used to handle the request. In an example, each new access request to a cached filesystem may be registered such that a list is compiled of the cached filesystems ranked by access times. In the example, the filesystems that have not been accessed for the longest time are evicted first when space is required. In an example, a count of the number of filesystems retrieved over an active use time window may be tracked by filesystem manager 140 to determine whether filesystem cache 160 is of sufficient size to handle the current filesystem access and usage rates in system 100.

The file in the filesystem is modified (block 335). In an example, after filesystem 168 is instantiated in filesystem cache 160 (e.g., as filesystem 268), the requested file 169 is retrieved and modified by accessing filesystem 268. In an example, even though filesystem 268 is resident in filesystem cache 160, an information request regarding filesystem 268 or a file 169 in filesystem 268 is still responded to by querying filesystem proxy 178. For example, requests for file paths, file creation timestamps, file modification time stamps, file sizes, whether a file exists, file access permissions, and file inodes may be responded to with filesystem proxy 178 rather than by accessing filesystem 268. In an example, further requests to access, modify, or execute files from filesystem 268 may be responded to by accessing filesystem 268 while filesystem 268 is resident in filesystem cache 160. In an example, filesystem 162, which is evicted from filesystem cache 160 to make room for filesystem 268, is deleted and removed from guest memory 195, virtual memory device 192, memory device 114, and/or filesystem cache 160. In an example, the memory pages storing filesystem 162 are overwritten rendering filesystem 162 irretrievable. In an example, filesystem 162 is later reinstantiated in filesystem cache 160 based on a content request (e.g., a file modification request) associated with a file accessible through filesystem 162 (e.g., a request from a user of a different client device). In the example, filesystem 162 is instantiated with metadata information describing the structure of filesystem 162 retrieved from filesystem proxy 172 associated with filesystem 162.

Figure 4:
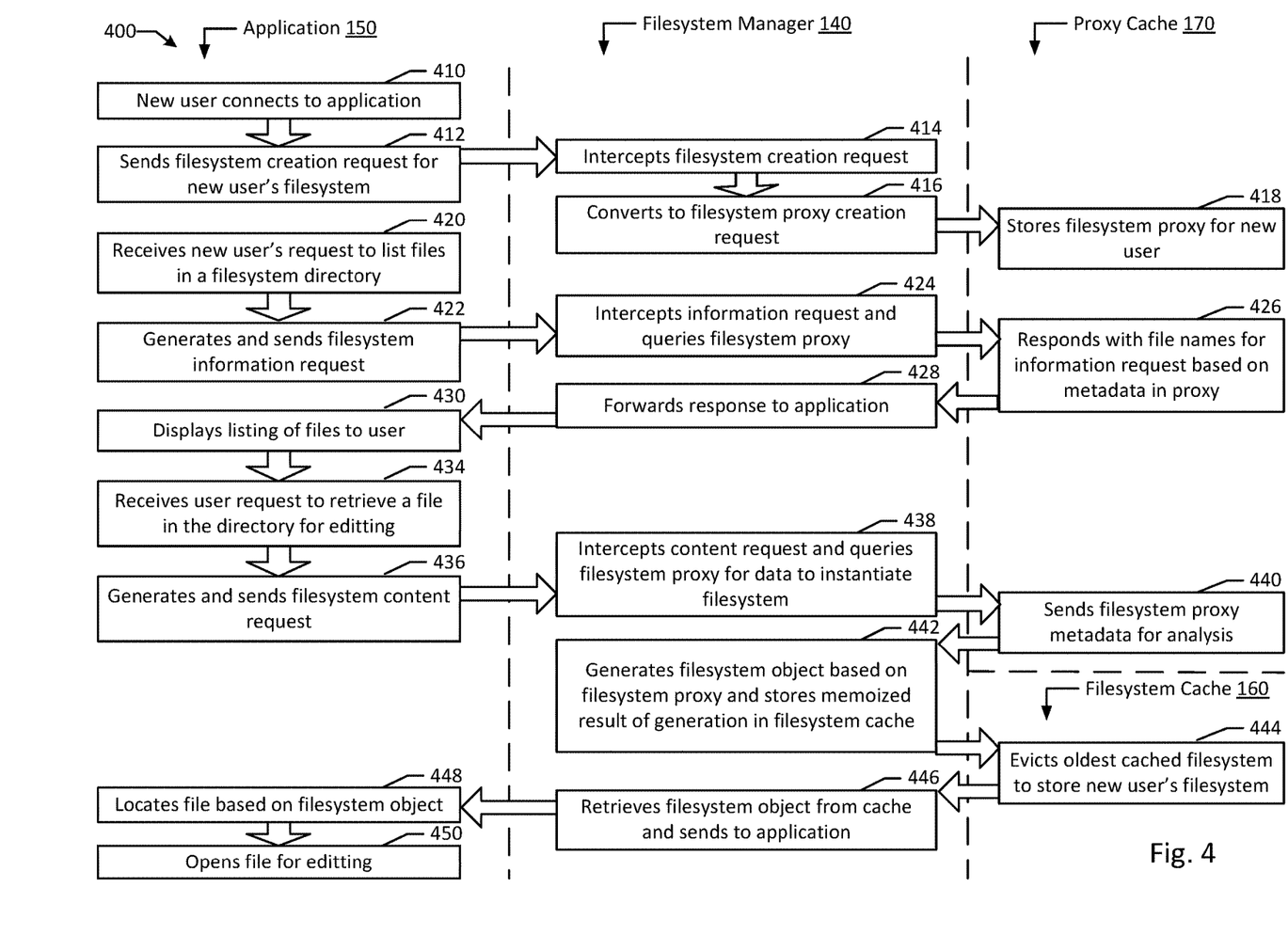
FIG. 4 is flow diagram of an example of filesystem request handling in a system implementing lazy virtual filesystem instantiation with filesystem proxies according to an example of the present disclosure.

FIG. 4 is flow diagram of an example of filesystem request handling in a system implementing lazy virtual filesystem instantiation with filesystem proxies according to an example of the present disclosure. Although the examples below are described with reference to the flow diagram illustrated in FIG. 4, it will be appreciated that many other methods of performing the acts associated with FIG. 4 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 400, filesystem manager 140 controls application 150's access to associated filesystems with proxy cache 170 and filesystem cache 160.

In example system 400, a new user account connects to application 150 (e.g., via client device 180) (block 410). In the example, application 150 sends a filesystem creation request (e.g., to guest OS 196, guest memory 195, and/or virtual memory device 192) for a filesystem associated with the new user account (block 412). In an example, filesystem manager 140 intercepts the filesystem creation request (block 414). Filesystem manager 140 then converts the filesystem creation request into a filesystem proxy creation request (block 416). In the example, filesystem proxy 178 is created and stored in proxy cache 170 for the new user account on client device 180 (block 418).

In an example, the new user account sends a request received by application 150 to list the files in one of the user account's filesystem directories (block 420). In the example, application 150 generates a filesystem information request based on the user's request and sends the filesystem information request to its host system (e.g., guest OS 196) (block 422). In an example, filesystem manager 140 intercepts the filesystem information request and queries filesystem proxy 178 for the listing of files (block 424). In the example, a response to the query is sent from proxy cache 170 that includes the file names for the files in the directory requested in the information request, where the response is generated based on metadata in filesystem proxy 178 (block 426). In an example, filesystem manager 140 forwards the response to application 150 (block 428). Application 150 then displays the listing of files to the user from client device 180 (block 430).

In an example, the user then sends a request received by application 150 to retrieve a file in the directory for editing (block 434). In the example, application 150 generates and sends a filesystem content request to retrieve the contents of the named file for editing (block 436). In an example, the content request is sent to filesystem manager 140. In another example, the content request is sent to guest OS 196, and is again intercepted by filesystem manager 140, which then queries filesystem proxy 178 for metadata to generate a structure of filesystem 268 associated with filesystem proxy 178 to instantiate filesystem 268 (block 438). In an example, filesystem 268 needs to be instantiated for the file to be accessed through filesystem 268. In an example, proxy cache 170 sends filesystem proxy 178's metadata to filesystem manager 140 for analysis for generating filesystem 268 (block 440). In the example, filesystem 140 generates a filesystem object for filesystem 268 based on filesystem proxy 178 and stores a memoized copy of the generation results in filesystem cache 160 (block 442). In the example, in order to store the memoized copy of filesystem 268 in filesystem cache 160, filesystem cache 160 evicts the oldest filesystem then resident in filesystem cache 160 (e.g., filesystem 162) (block 444). In an example, filesystem manager 160 retrieves the newly stored filesystem 268 from filesystem cache 160 and provides access to filesystem 268 to application 150 (e.g., by sending filesystem 268 to application 150) (block 446). In an example, filesystem manager 140 provides access to a memory location storing filesystem 268 to application 150. In an example, application 150 locates the file requested for editing based on the retrieved filesystem object (e.g., the memoized copy of filesystem 268) (block 448). In the example, application 150 opens the requested file for editing. In an example, after the file is edited, metadata in filesystem proxy 178 is updated reflecting the update to the file (e.g., an updated modification time). Thus, a later request for a modification time may be efficiently responded to by only querying the filesystem proxy 178. In an example, filesystem proxy 178 is immediately updated when the file is edited, for example, in systems where filesystem manager 140 sends all filesystem requests to a filesystem proxy first, a file modification time in filesystem proxy 178 may be tentatively updated prior to the file modification actually being committed and saved to the file in filesystem 168. In systems where file modification requests are sent directly to filesystem 168, filesystem proxy 178 may be updated after the file modification is saved. In an example, filesystem proxy 178 may be updated lazily at any point in time after the change to the file is saved. In an alternative example, moving the file from one directory to another within filesystem 168/268 may not require the instantiation of the filesystem because the directory move may be achieved by updating a metadata path of the file in filesystem proxy 178.

Figure 5:
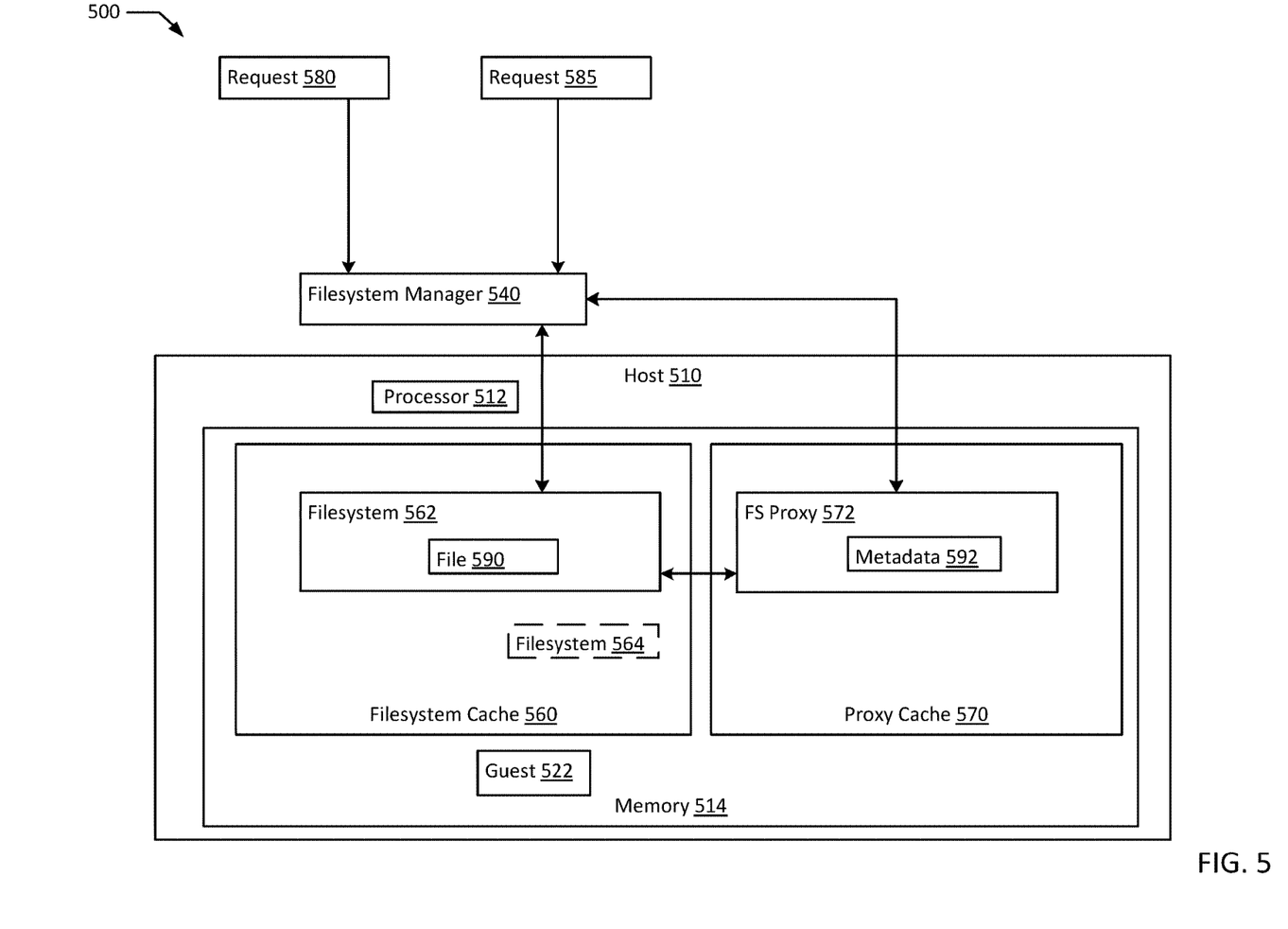
FIG. 5 is block diagram of a system implementing lazy virtual filesystem instantiation according to an example of the present disclosure.

FIG. 5 is block diagram of a system implementing lazy virtual filesystem instantiation according to an example of the present disclosure. Example system 500 includes host 510 with processor 512 and memory 514, which stores guest 522, filesystem cache 560, and proxy cache 570. Filesystem manager 540 executes on processor 512 to receive request 580 to locate file 590 in filesystem 562. In response to receiving request 580, filesystem manager 540 queries filesystem proxy 572 associated with filesystem 562 in proxy cache 570 and responds to request 580 based on metadata 592 retrieved from filesystem proxy 572. Filesystem manager 540 receives request 585 to modify file 590. In response to receiving request 585, filesystem manager 540 instantiates filesystem 562 in filesystem cache 560, where filesystem 564 is evicted from filesystem cache 560 to reclaim storage capacity for filesystem 562. File 590 is then modified in filesystem 562.

The presently described lazy virtual filesystem instantiation and caching allows the avoidance a significant portion of the computing cost of differentiated filesystems in a computing environment by only performing computationally expensive tasks such as generating a filesystem when the filesystem itself is actually required. By implementing light weight metadata based filesystem proxies which may be queried in place of actual filesystems for many typical filesystem tasks, the security and access control advantages of differentiated filesystems associated with different users may be achieved without the overhead of generating and storing all of the individual filesystems for the different user accounts on a system. For the relatively limited number of requests that actually require access to the contents of files in a filesystem (e.g., requests that cannot be handled through metadata operations involving a filesystem proxy alone), a limited number of filesystems may be generated and cached. As file access and modification requests are typically clumped together into a given access session, after the session is over, these filesystems may be safely removed from the filesystem cache thereby limiting the storage requirements for filesystems. Lazy virtual filesystem instantiation and caching therefore enables reduced memory and processor consumption at the cost of a slight latency penalty the first time a given filesystem is accessed for the contents of the filesystem's files during a given user session. However, this latency penalty is also defrayed by the latency boost offered by faster query responses from filesystem proxies for requests that may be handled via metadata operations regardless of whether the filesystem in question has already been created or not.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a physical host with a processor and a memory, which stores a guest, a filesystem cache, and a proxy cache, wherein the filesystem cache storing filesystems is implemented in a first memory partition and the proxy cache storing filesystem proxies is implemented in a second memory partition;
a filesystem manager executing on the processor to:
receive a first request to locate a file in a first filesystem;
responsive to receiving the first request, query a first filesystem proxy in the proxy cache associated with the first filesystem;
respond to the first request based on metadata retrieved from the first filesystem proxy;
receive a second request to modify the file;
responsive to receiving the second request, query the first filesystem proxy in the proxy cache, and responsive to the first filesystem proxy being incapable of modifying the file, the second request is rerouted to the filesystem cache, which instantiates the first filesystem in the filesystem cache, wherein a second filesystem is evicted from the filesystem cache to reclaim storage capacity for the first filesystem, wherein a second filesystem proxy in the filesystem cache is maintained in the filesystem cache to allow reinstantiation of the second filesystem in the filesystem cache; and
modify the file in the first filesystem.

2. The system of claim 1, wherein the filesystem manager intercepts a filesystem instantiation request associated with the first filesystem and generates the first filesystem proxy instead of instantiating the first filesystem.

3. The system of claim 1, wherein the filesystem cache is limited to at least one of a maximum count of filesystems in the filesystems and a maximum aggregated size of the filesystems.

4. The system of claim 3, wherein at least one of the maximum count and the maximum aggregated size is configured to be increased based on a cache miss rate of the filesystem cache.

5. The system of claim 4, wherein the cache miss rate is calculated based on at least one of a rolling count of filesystem instantiations over a configured time window, and a count of the filesystems accessed during an active use time window.

6. The system of claim 3, wherein each filesystem is memoized.

7. The system of claim 6, wherein memoizing the first filesystem includes computing a structure of the first filesystem, and storing a computation results of the structure.

8. The system of claim 7, wherein requests for the first filesystem are responded to with the stored computation results instead of by recalculating the structure of the first filesystem.

9. The system of claim 1, wherein the second filesystem is deleted and removed from the memory upon being evicted from the filesystem cache, and the second filesystem is later reinstantiated in the filesystem cache in response to a file modification request through a second filesystem proxy in the proxy cache associated with the second filesystem.

10. The system of claim 1, wherein the filesystem manager presents to the guest that the first filesystem exists in the filesystem cache based on the first filesystem proxy being stored in the proxy cache while the first filesystem is one of uninstantiated and evicted from the filesystem cache.

11. The system of claim 1, wherein information requests associated with the first filesystem are responded to by querying the first filesystem proxy, and the first filesystem is only instantiated in response to content requests to at least one of access and modify any file of the first filesystem.

12. The system of claim 1, wherein the first filesystem is a virtual filesystem exposing limited access to at least one of a guest filesystem of the guest and a host filesystem of the host.

13. The system of claim 10, wherein the virtual filesystem is a database schema.

14. The system of claim 1, wherein each of the filesystems and each of the filesystem proxies is associated with a respective user accessing the guest.

15. The system of claim 1, wherein an information request to the first filesystem is responded to by querying the first filesystem proxy while the first filesystem is instantiated and resident in the filesystem cache.

16. The system of claim 15, wherein a content request to the first filesystem is responded to by accessing the first filesystem in the filesystem cache.

17. The system of claim 15, wherein the information request retrieves one of a file path, creation timestamp, modification timestamp, size, existence, access permissions, and an inode.

18. A method comprising:
receiving a first request to locate a file in a first filesystem;
responsive to receiving the first request, querying a filesystem proxy in a proxy cache associated with the first filesystem, wherein a filesystem cache storing filesystems is implemented in a first memory partition and the proxy cache storing filesystem proxies is implemented in a second memory partition;
responding to the first request based on metadata retrieved from the filesystem proxy;
receiving a second request to modify the file;
responsive to receiving the second request, querying the first filesystem proxy in the proxy cache, and responsive to the first filesystem proxy being incapable of modifying the file, the second request is rerouted to the filesystem cache, which instantiates the first filesystem in the filesystem cache, wherein a second filesystem is evicted from the filesystem cache to reclaim storage capacity for the first filesystem;
modifying the file in the first filesystem; and
maintaining a second filesystem proxy corresponding to the second filesystem in the filesystem cache to allow reinstantiation of the second filesystem in the filesystem cache.

19. The method of claim 18, further comprising:
intercepting a filesystem instantiation request associated with the first filesystem and
generating the filesystem proxy instead of instantiating the first filesystem.

20. A computer-readable non-transitory storage medium storing executable instructions, which when executed by a computer system, cause the computer system to:
receive a first request to locate a file in a first filesystem;
responsive to receiving the first request, query a filesystem proxy in a proxy cache associated with the first filesystem, wherein a filesystem cache storing filesystems is implemented in a first memory partition and the proxy cache storing filesystem proxies is implemented in a second memory partition;
respond to the first request based on metadata retrieved from the filesystem proxy;
receive a second request to modify the file;
responsive to receiving the second request, querying the first filesystem proxy in the proxy cache, and responsive to the first filesystem proxy being incapable of modifying the file, the second request is rerouted to the filesystem cache, which instantiates the first filesystem in the filesystem cache, wherein a second filesystem is evicted from the filesystem cache to reclaim storage capacity for the first filesystem;
modify the file in the first filesystem; and
maintain a second filesystem proxy corresponding to the second filesystem in the filesystem cache to allow reinstantiation of the second filesystem in the filesystem cache.

* * * * *